(12) United States Patent
Kim et al.

(10) Patent No.: US 8,690,650 B2
(45) Date of Patent: Apr. 8, 2014

(54) AIR-CONDITIONER FOR VEHICLE

(75) Inventors: Moo Yong Kim, Suwon-si (KR); Tae Han Kim, Seoul (KR); Hun Soo Kim, Bucheon-si (KR); Hee Jun Jeong, Hwaseong-si (KR); Chun Shik Jeong, Daejeon-si (KR); Seong Seok Han, Daejeon-si (KR)

(73) Assignees: Hyundai Motor Company, Seoul (KR); Kia Motors Corp., Seoul (KR); Halla Climate Control Corp., Daejeon-Si (KR)

(*) Notice: Subject to any disclaimer, the term of this patent is extended or adjusted under 35 U.S.C. 154(b) by 1062 days.

(21) Appl. No.: 12/622,638

(22) Filed: Nov. 20, 2009

(65) Prior Publication Data
US 2011/0021130 A1 Jan. 27, 2011

(30) Foreign Application Priority Data
Jul. 21, 2009 (KR) ................. 10-2009-0066177

(51) Int. Cl.
*B60S 1/54* (2006.01)
(52) U.S. Cl.
USPC ............ 454/125; 454/144; 454/152; 454/160
(58) Field of Classification Search
USPC .................... 454/121, 125, 144, 152, 160
See application file for complete search history.

(56) References Cited

U.S. PATENT DOCUMENTS

| | | | |
|---|---|---|---|
| 5,884,689 A * | 3/1999 | Takechi et al. | 165/43 |
| 6,482,081 B2 * | 11/2002 | Vincent et al. | 454/121 |
| 6,644,559 B2 * | 11/2003 | Kondo et al. | 237/12.3 B |
| 8,292,704 B2 * | 10/2012 | Storgato et al. | 454/121 |
| 2006/0021424 A1 * | 2/2006 | Ishikawa et al. | 73/118.2 |
| 2008/0253879 A1 * | 10/2008 | Kang et al. | 415/98 |
| 2010/0167635 A1 * | 7/2010 | Gotoh et al. | 454/121 |

FOREIGN PATENT DOCUMENTS

| | | |
|---|---|---|
| CN | 2430296 (Y) | 5/2001 |
| JP | S 58110512 (U) | 7/1983 |
| JP | 2001071733 (A) | 3/2001 |
| JP | 2002337533 (A) | 11/2002 |
| JP | 2005-534565 A | 11/2005 |
| WO | WO 2009/075279 (A1) | 6/2009 |

* cited by examiner

*Primary Examiner* — Stephen M Hepperle
*Assistant Examiner* — Ian Paquette
(74) *Attorney, Agent, or Firm* — Morgan, Lewis & Bockius LLP (57) ABSTRACT

An air-conditioner for a vehicle, may include a casing having an upper outlet and a lower outlet, with an air flow space defined in the casing and including an upper space and a lower space to guide air to the upper outlet and/or the lower outlet, an evaporator installed in the casing and selectively communicating with the upper outlet through the upper space, and a distributing partition wall to partition the lower space into a receiving space to receive a heating member therein and selectively communicate with the upper space and at least a partitioned space to communicate the heating member with the lower outlet, thus guiding the air to a side portion of the casing.

4 Claims, 8 Drawing Sheets

AIR-CONDITIONER FOR VEHICLE

The present application claims priority to Korean Patent Application No. 10-2009-0066177, filed on Jul. 21, 2009, the entire contents of which is incorporated herein for all purposes by this reference.

BACKGROUND OF THE INVENTION

1. Field of the Invention

The present invention relates, in general, to air-conditioners for vehicles and, more particularly, to an air-conditioner for a vehicle, which is capable of reducing the volume of a casing in a front-back transverse direction of the casing.

2. Description of Related Art

Generally, a vehicle is equipped with an air-conditioner for controlling the temperature and humidity of the air in the interior thereof. The air-conditioner generates warm air from a heater in the winter season, thus keeping the interior of the vehicle warm, and generates cool air from an evaporator in the summer season, thus keeping the interior of the vehicle cool.

Figure 7A:
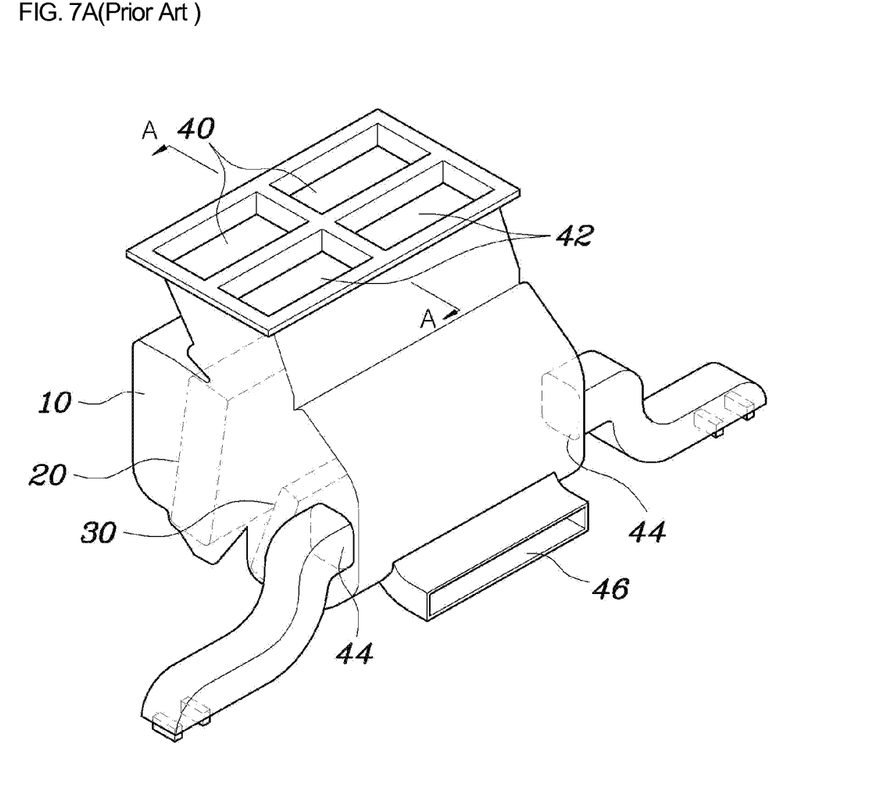
FIG. 7A is a perspective view illustrating a conventional air-conditioner for a vehicle.

As shown in FIG. 7A, a conventional air-conditioner for a vehicle comprises a casing 10, with both an evaporator 20 and a heater 30 installed in the casing 10. The evaporator 20 cools the air flowing in the interior of the casing 10, thus producing cool air, while the heater 30 heats the air flowing in the casing 10, thus producing warm air.

Further, the air-conditioner is provided with a defrost vent 40, a face vent 42, a shower vent 44, and a floor vent 46, which discharge air from the heater 30 or the evaporator 20 into the interior of the vehicle. Here, the defrost vent 40 discharges air from the heater 30 or the evaporator 20 to a windshield during DEF mode or mix mode. The face vent 42 discharges air from the heater 30 or the evaporator 20 towards the faces of a driver and a passenger when in vent mode or bi-level mode. The shower vent 44 and the floor vent 46 discharge air from the heater 30 or the evaporator 20 to the knees and legs of a driver and a passenger, or to the floor or rear seat in the vehicle during floor mode or bi-level mode.

Figure 7B:
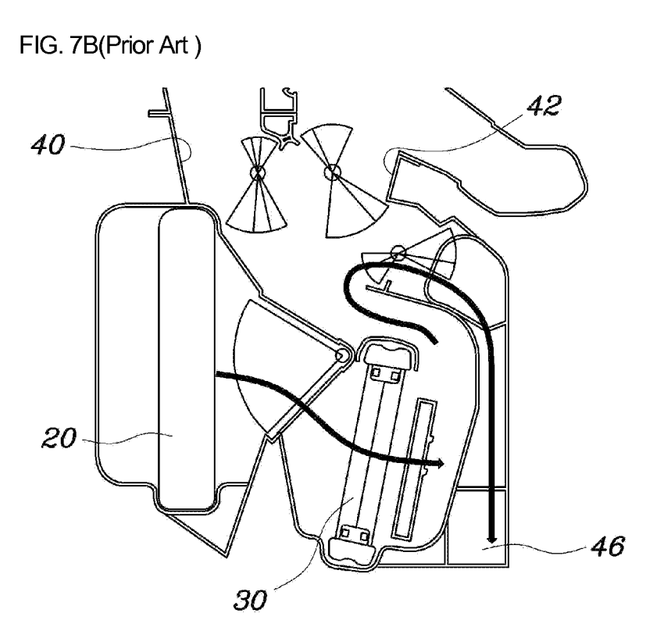
FIG. 7B is a sectional view taken along line "A-A" of FIG. 7A.

As shown in FIG. 7B, the conventional air-conditioner is problematic in that an additional space must be provided in the rear portion of the casing to discharge air to the floor vent 46, so that it is difficult to realize space intensive arrangement and design of the vehicle. Especially in terms of the design of the interior of the vehicle, the space intensive arrangement and design has been emphasized.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an air-conditioner for a vehicle, which reduces the volume of a casing in a front-back transverse direction thereof, thus enhancing the space utilization of the interior of a vehicle.

In an aspect of the present invention, the air-conditioner for a vehicle, may include a casing having an upper outlet and a lower outlet, with an air flow space defined in the casing to guide air to the upper outlet and the lower outlet, an evaporator and a heater core installed in the casing, and a distributing partition wall having a partitioned space, and partitioning the air flow space into upper and lower spaces, thus guiding air to a side portion of the casing.

The air-conditioner may further include a mode door provided above the distributing partition wall, and opening or closing the air flow space to allow the air to pass through the upper outlet.

The upper outlet may include a defrost vent and a face vent, and the lower outlet includes a shower vent and a floor vent, wherein the distributing partition wall includes, an inlet port enabling air passing through the heater core to communicate with the air flow space, and a shower outlet port communicating with the shower vent.

A shower duct may be coupled to the shower outlet port, and includes a casing cover portion which entirely covers the shower outlet port, and a shower duct portion which communicates with the casing cover portion and extends to a position corresponding to a passenger's feet.

The shower duct may further include a support portion which is provided on the casing cover portion to support a rotating shaft of the mode door, the support portion including a rotary hole into which an end of the rotating shaft of the mode door is inserted, and an angle adjusting rib which limits a rotating angle of the rotating shaft.

The shower duct may be provided, by double injection molding, in the shower outlet port of the casing which is manufactured by injection molding, so that the shower duct is integrated with the casing.

In another aspect of the present invention, the air-conditioner for a vehicle, may include a casing having an upper outlet and a lower outlet, with an air flow space defined in the casing and including an upper space and a lower space to guide air to the upper outlet and/or the lower outlet, an evaporator installed in the casing and selectively communicating with the upper outlet through the upper space, and a distributing partition wall to partition the lower space into a receiving space to receive a heating member therein and selectively communicate with the upper space and at least a partitioned space to communicate the heating member with the lower outlet, thus guiding the air to a side portion of the casing.

The distributing partition wall may include a pair of distributing partition walls which are provided on opposite sides of an upward flowing path enabling the air to flow upwards from the heating member installed in the receiving space and the partition walls are placed side by side, and the partitioned space formed by the distributing partition wall may be a downward flowing path for guiding air from the upward flowing path to the lower outlet.

The air-conditioner may further include a mode door provided above the distributing partition wall between the upper and lower spaces to selectively allow air to pass through the upper outlet.

The upper outlet may include a defrost vent and a face vent, and the lower outlet includes a shower vent and a floor vent.

The distributing partition wall may include an inlet port communicating the heating member with the partitioned space that is fluidly connected to the floor vent, and a shower outlet port communicating the partitioned space with the shower vent.

A shower duct may be coupled to the shower outlet port, and may include a casing cover portion which entirely covers the shower outlet port, and a shower duct portion which communicates with the casing cover portion and the shower outlet port and extends to a position corresponding to a passenger's feet to form the shower duct, wherein the shower duct further includes a support portion which is provided on the casing cover portion to support a rotating shaft of the mode door, the support portion having a rotary hole into which an end of the rotating shaft of the mode door is inserted, and an angle adjusting rib which limits a rotating angle of the rotating shaft, and wherein the shower duct is provided, by double injection molding, in the shower outlet port of the casing which is manufactured by injection molding, so that the shower duct is integrated with the casing.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the invention, an example of which is illustrated in the accompanying drawings.

Figure 1:
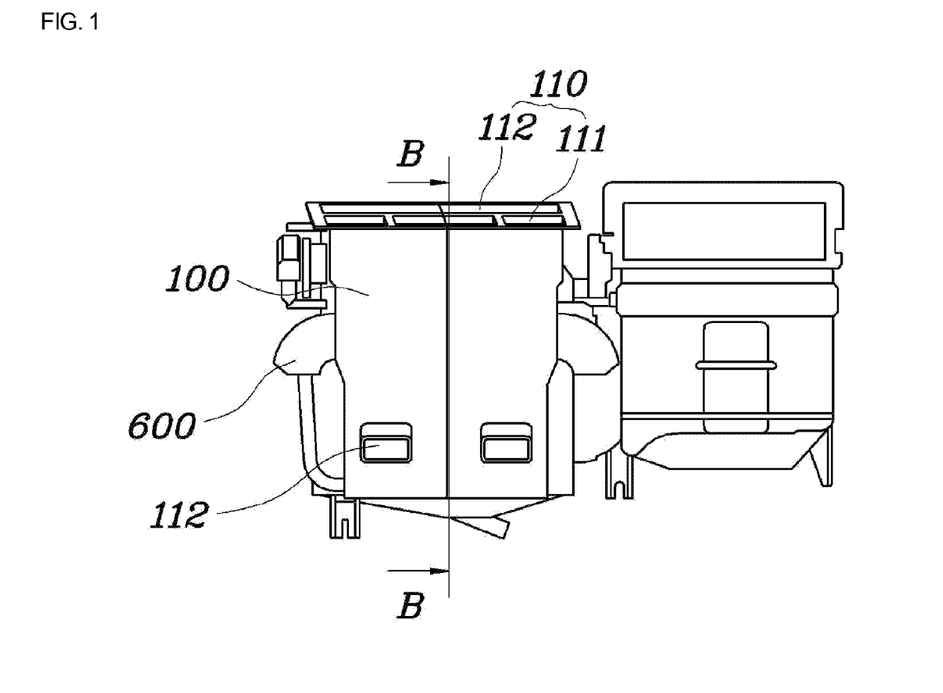
FIG. 1 is a perspective view illustrating an air-conditioner for a vehicle according to an exemplary embodiment of the present invention.
Figure 2:
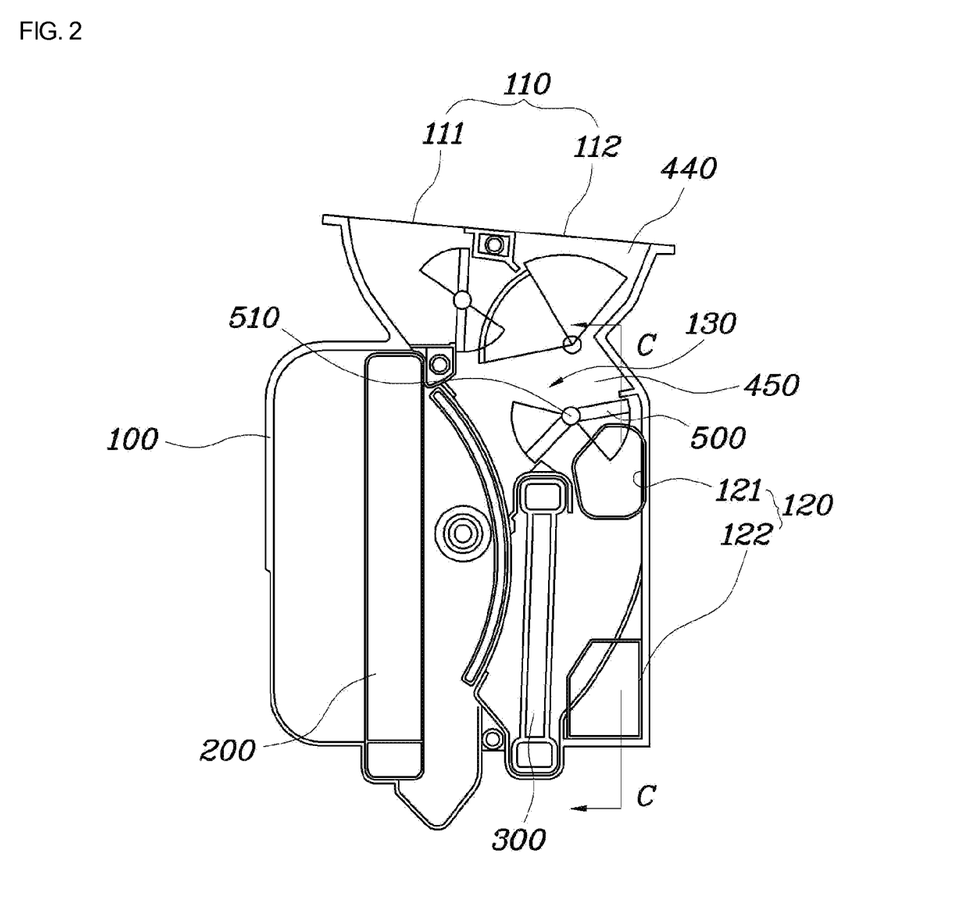
FIG. 2 is a sectional view taken along line "B-B" of FIG. 1.
Figure 3:
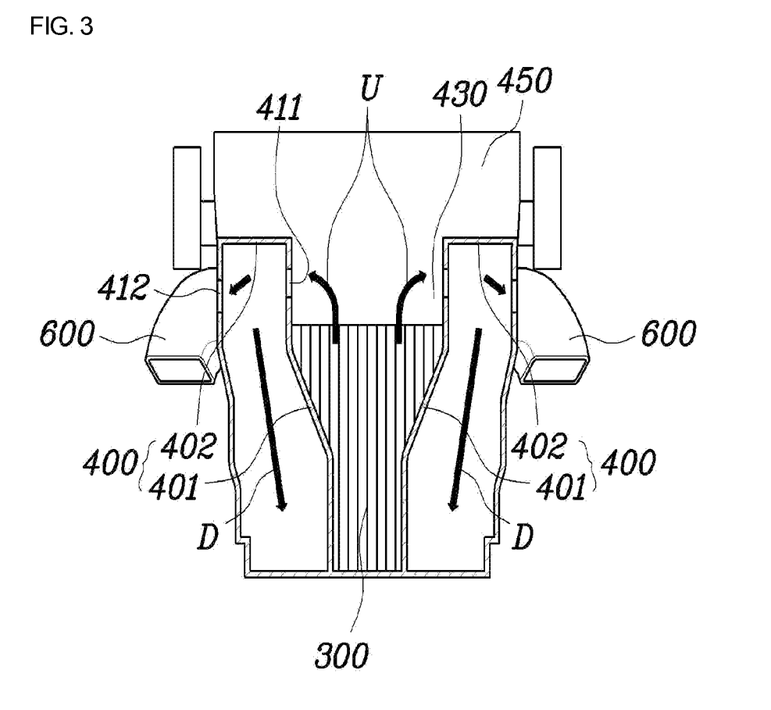
FIG. 3 is a sectional view taken along line "C-C" of FIG. 2.

As shown in FIGS. 1 to 3, an air-conditioner for a vehicle according to an exemplary embodiment of the present invention is constructed to guide air from an evaporator 200 or a heater core 300 through a distributing partition wall 400 to a side portion of a casing 100. Such a construction reduces the volume of the casing 100 in its front-back transverse direction, thus enhancing the space utilization in the vehicle.

To this end, the air-conditioner, in an exemplary embodiment of the present invention, includes the casing 100, the evaporator 200 and the heater core 300 installed in the casing 100, and the distributing partition wall 400 which guides air from the evaporator 200 and the heater core 300 to the side portion of the casing 100.

The casing 100 has an air flow space 130 to enable the air to flow. The air flow space 130 is partitioned into predetermined spaces. A door may be installed in each partitioned space to control the flow of the air.

An upper outlet 110 and a lower outlet 120 are provided in the casing 100 to discharge air from the casing 100. The upper outlet 110 includes a defrost vent 111 which discharges the air towards a windshield, and a face vent 112 which discharges the air towards the faces of a driver and a passenger. Meanwhile, the lower outlet 120 includes a shower vent 121 which discharges the air towards the knees and legs of a driver and a passenger, and a floor vent 122 which discharges the air towards the floor or rear seat of the vehicle.

Further, the casing 100 is provided with the evaporator 200 which cools the air in the casing 100 to generate cool air, and the heater core 300 which heats the air in the casing 100 to generate warm air. Since the evaporator 200 and the heater core 300 are comparable to an evaporator and a heater core applied to a general air-conditioner, the detailed description of the evaporator 200 and the heater core 300 will be omitted herein. However, according to this invention, the air, which has passed through the evaporator 200 or the heater core 300, is guided through the air flow space 130 to a partitioned space 410 of the distributing partition wall 400.

The distributing partition wall 400 divides the air flow space 130 defined in the rear portion of the casing 100 into upper and lower spaces 440 and 450, thus guiding the air from the heater core 300 to the side portion of the casing 100. That is, the distributing partition wall 400 includes a first partition wall 401 which forms a wall between the partition wall 400 and the heater core 300, and a second partition wall 402 which is coupled to the first partition wall 401 to be perpendicular thereto. The partitioned space 410 is surrounded by the first and second partition walls 401 and 402 and by the back of the casing 100. A receiving space 430 may be formed between the partitioned space 410 to receive the heater core 300 therein.

The partitioned space 410 is a path which is defined in the rear portion of the casing 100 to guide air to the left and right sides of the casing 100. That is, the partitioned space 410 guides the air from the heater core 300 to the shower vent 121 of the lower outlet 120. To this end, an inlet port 411 is provided in the distributing partition wall 400 to allow the air passing through the heater core 300 to communicate with the air flow space 130, and a shower outlet port 412 is provided in the distributing partition wall 400 to communicate with the shower vent 121.

According to this invention, a pair of distributing partition walls 400 is provided on the rear portion of the casing 100 side by side. An upward flowing path U is formed between the pair of distributing partition walls 400 to allow air to flow upwards from the heater core 300 in the casing 100. Thus, after air flows upwards from the heater core 300 through the upward flowing path U, the air flows through the inlet port 411 of each distributing partition wall 400 to the partitioned space 410, and the air fed to the partitioned space 410 flows downwards, so that the air is discharged to the floor vent 122, or discharged through the shower outlet port 412 of the distributing partition wall 400 to the shower vent 121. Meanwhile, the partitioned space 410 serves as a downward flowing path D to guide the air, fed from the upward flowing path U, to the shower vent 121 or the floor vent 122.

Meanwhile, a mode door 500 is provided in the casing 100 to enable air to selectively flow from the heater core 300 through the upper outlet 110. The mode door 500 is rotatably installed above the distributing partition wall 400 via a rotating shaft 510. Thus, when the mode door 500 closes an associated path, air does not flow from the heater core 300 to the upper outlet 110, namely, the defrost vent 111 and the face vent 112. In contrast, when the mode door 500 opens the associated path, air may flow from the heater core 300 to the upper outlet 110, namely, the defrost vent 111 and the face vent 112.

In order to make the construction of the present invention clear, the construction of the air-conditioner according to the present invention will be described in detail with reference to the accompanying drawings.

Figure 4:
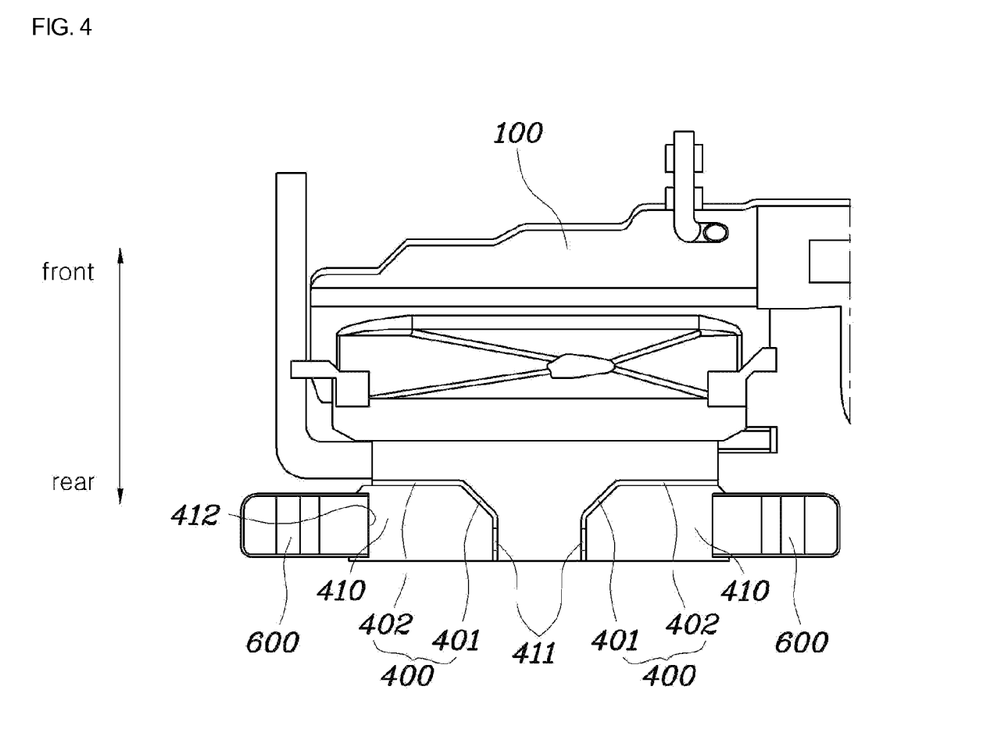
FIG. 4 is a partial cutaway sectional view illustrating the upper portion of the air-conditioner according to an exemplary embodiment of the present invention.

As shown in FIG. 4, a pair of distributing partition walls 400 is provided in the rear portion of the casing 100 in such a way as to be placed on the left and right sides of the upward flowing path U. Owing to such a construction, after air passes through the heater core 300 to the upward flowing path U in the rear portion of the casing 100, the air flows to the side portion of the casing 100, and passes through the downward flowing path D of each distributing partition wall 400 to the shower vent 121 or the floor vent 122.

According to an exemplary embodiment of the present invention, air flows through the side portion of the casing 100 to the shower vent 121 or the floor vent 122, thus obviating the necessity of ensuring an additional space which protrudes to the rear portion of the casing 100 to discharge the air to the floor vent 122, therefore solving the problem of the conventional air-conditioner.

A shower duct 600 is provided on the casing 100 in such a way as to surround the sidewall of the casing 100 and communicate with the shower vent 121.

Figure 5:
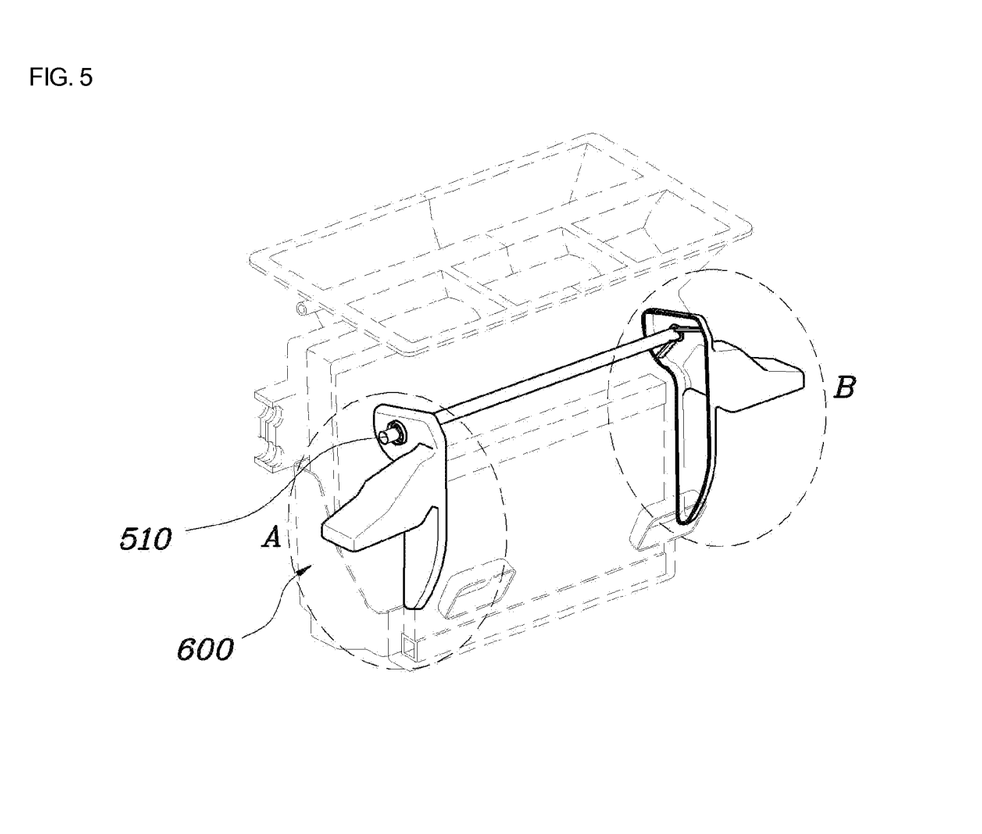
FIG. 5 is a view illustrating the construction of the air-conditioner having a shower duct according to an exemplary embodiment of the present invention.
Figure 6A:
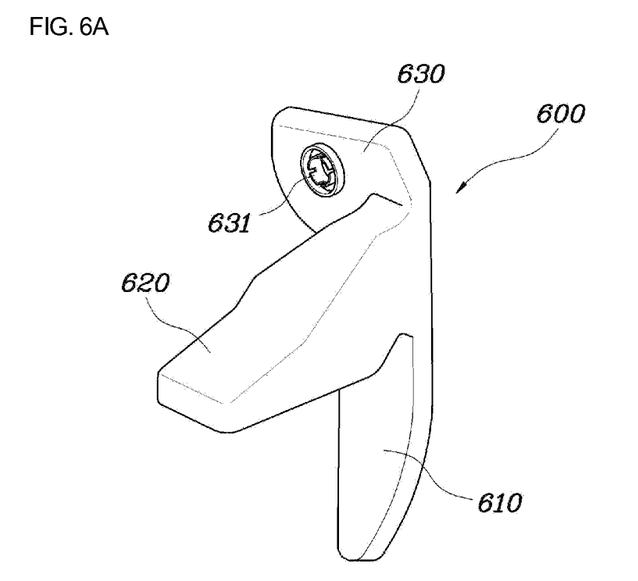
FIG. 6A is an enlarged view illustrating portion "A" of FIG. 5.
Figure 6B:
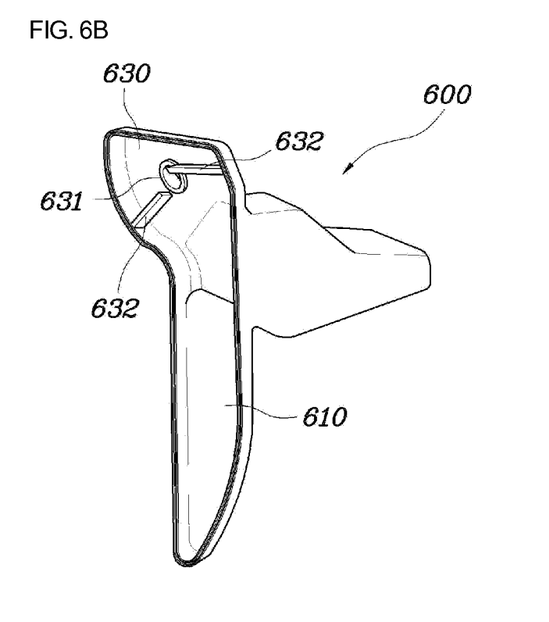
FIG. 6B is an enlarged view illustrating portion "B" of FIG. 5.

As shown in FIGS. 5 to 6B, preferably, the shower duct 600 is provided through double injection molding in the shower outlet port 412 of the casing 100 which is manufactured by injection molding so that the shower duct 600 is integrated with the casing 100. The manufacturing operation of the shower duct 600 by double injection molding is performed for the reason that when the casing 100 and the distributing partition wall 400 are integrated with each other through injection molding, the sidewall of the casing 100 is inevitably open. In order to cover the open portion of the casing 100 and integrate the shower duct 600 with the casing 100, the double injection molding between the casing 100 and the shower duct 600 is the most suitable.

Here, the shower duct 600 includes a casing cover portion 610, a support portion 630, and a shower duct portion 620. The casing cover portion 610 entirely covers the shower outlet port 412 of the distributing partition wall 400. The support portion 630 is provided on the casing cover portion 610 to support the rotating shaft 510 of the mode door 500. The shower duct portion 620 extends to a position corresponding to a passenger's feet while communicating with the casing cover portion 610.

Further, a rotary hole 631 and an angle adjusting rib 632 are provided on the support portion 630. The rotary hole 631 is formed in the support portion 630 so that an end of the rotating shaft 510 of the mode door 500 is inserted into the rotary hole 631. The angle adjusting rib 632 is provided on the support portion 630 to limit the rotating angle of the rotating shaft 510. Thus, when an associated end of the mode door 500 is inserted into the rotary hole 631 of the support portion 630, the rotating angle is limited at a predetermined angle by the angle adjusting rib 632.

As apparent from the above description, the air-conditioner according to the present invention provides an advantage in that an additional space for discharging air to a floor vent or to a shower vent is not formed in the rear portion of a casing, so that a thin casing is realized. Consequently, the air-conditioner of the present invention provides an advantage in that space intensive arrangement of parts in the narrow interior of a vehicle is achieved.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air-conditioner for a vehicle, comprising:
   a casing having an upper outlet and a lower outlet, with an air flow space defined in the casing to guide air to the upper outlet and the lower outlet;
   an evaporator and a heater core installed in the casing; and
   a distributing partition wall having a partitioned space, and partitioning the air flow space into upper and lower spaces, thus guiding air to a side portion of the casing;
   a mode door provided above the distributing partition wall, and opening or closing the air flow space to allow the air to pass through the upper outlet;
   wherein the upper outlet comprises a defrost vent and a face vent, and the lower outlet comprises a shower vent and a floor vent;
   wherein the distributing partition wall comprises: an inlet port enabling air passing through the heater core to communicate with the air flow space; and a shower outlet port communicating with the shower vent;
   wherein a shower duct is coupled to the shower outlet port, and comprises a casing cover portion which entirely covers the shower outlet port, and a shower duct portion which communicates with the casing cover portion and extends to a position corresponding to a passenger's feet; and
   wherein the shower duct further comprises a support portion which is provided on the casing cover portion to support a rotating shaft of the mode door, the support portion comprising a rotary hole into which an end of the rotating shaft of the mode door is inserted, and an angle adjusting rib which limits a rotating angle of the rotating shaft.

2. The air-conditioner as set forth in claim 1, wherein the shower duct is provided, by double injection molding, in the shower outlet port of the casing which is manufactured by injection molding, so that the shower duct is integrated with the casing.

3. An air-conditioner for a vehicle, comprising:
- a casing having an upper outlet and a lower outlet, with an air flow space defined in the casing and including an upper space and a lower space to guide air to the upper outlet and/or the lower outlet;
- an evaporator installed in the casing and selectively communicating with the upper outlet through the upper space; and
- a distributing partition wall to partition the lower space into a receiving space to receive a heating member therein and selectively communicate with the upper space and at least a partitioned space to communicate the heating member with the lower outlet, thus guiding the air to a side portion of the casing; and
- a mode door provided above the distributing partition wall between the upper and lower spaces to selectively allow air to pass through the upper outlet;
- wherein the distributing partition wall comprises a pair of distributing partition walls which are provided on opposite sides of an upward flowing path enabling the air to flow upwards from the heating member installed in the receiving space and the partition walls are placed side by side, and the partitioned space formed by the distributing partition wall is a downward flowing path for guiding air from the upward flowing path to the lower outlet;
- wherein the upper outlet includes a defrost vent and a face vent, and the lower outlet includes a shower vent and a floor vent;
- wherein the distributing partition wall includes: an inlet port communicating the heating member with the partitioned space that is fluidly connected to the floor vent; and a shower outlet port communicating the partitioned space with the shower vent;
- wherein a shower duct is coupled to the shower outlet port, and includes: a casing cover portion which entirely covers the shower outlet port; and a shower duct portion which communicates with the casing cover portion and the shower outlet port and extends to a position corresponding to a passenger's feet to form the shower duct; and
- wherein the shower duct further comprises a support portion which is provided on the casing cover portion to support a rotating shaft of the mode door, the support portion having a rotary hole into which an end of the rotating shaft of the mode door is inserted, and an angle adjusting rib which limits a rotating angle of the rotating shaft.

4. The air-conditioner as set forth in claim 3, wherein the shower duct is provided, by double injection molding, in the shower outlet port of the casing which is manufactured by injection molding, so that the shower duct is integrated with the casing.

* * * * *